United States Patent [19]

Blandin et al.

[11] Patent Number: 5,709,354
[45] Date of Patent: Jan. 20, 1998

[54] LOADING APPARATUS FOR AN UNWINDER

[75] Inventors: Christophe Louis Michel Blandin; Guy Roulleau, both of Chalon sur Saone, France

[73] Assignee: Eastman Kodak Company, Rochester, N.Y.

[21] Appl. No.: 596,808

[22] Filed: Feb. 5, 1996

[30] Foreign Application Priority Data

Mar. 22, 1995 [FR] France .................................. 95 03574

[51] Int. Cl.$^6$ .................. B65H 19/00; B65H 21/00; B65H 69/00

[52] U.S. Cl. .................. 242/551; 242/556.1; 242/559.1

[58] Field of Search .................. 242/556, 556.1, 242/559.1, 559.2, 559.3, 560.1, 551, 552

[56] References Cited

U.S. PATENT DOCUMENTS

| | | | |
|---|---|---|---|
| 4,097,323 | 6/1978 | De Roeck et al. | 242/556.1 X |
| 4,139,163 | 2/1979 | Tabel et al. | 242/556.1 X |
| 4,264,194 | 4/1981 | Pone et al. | |
| 4,450,039 | 5/1984 | Salvucci et al. | |
| 4,540,459 | 9/1985 | Stewart et al. | |
| 4,738,739 | 4/1988 | Schoonderbeek | 242/556.1 X |
| 5,297,751 | 3/1994 | Boldrini et al. | 242/560.1 |

FOREIGN PATENT DOCUMENTS

| | | | |
|---|---|---|---|
| 651583 | 11/1991 | Australia | 242/556 |
| 114200 | 8/1984 | European Pat. Off. . | |
| 595202 | 4/1994 | European Pat. Off. . | |
| 3734896 | 4/1989 | Germany . | |
| 4330717 | 3/1995 | Germany . | |
| 2264147 | 11/1987 | Japan | 242/559.3 |
| 3225056 | 9/1988 | Japan | 242/559.3 |
| 2066043 | 3/1990 | Japan | 242/559.1 |

Primary Examiner—John M. Jillions
Assistant Examiner—William A. Rivera
Attorney, Agent, or Firm—Susan L. Parulski

[57] ABSTRACT

A loading apparatus for transferring a first roll from a preparation apparatus to an unwinding apparatus. The preparation apparatus includes a shaft onto which a first roll is loaded, and supports connected to a vacuum source to maintain the web wound about a circulation loop. When a second roll loaded on the unwinding apparatus is expired, the preparation apparatus is rotated about an axis to register the preparation apparatus' shaft with the unwinding apparatus' shaft, and the first roll is then transferred from the preparation apparatus' shaft to the unwinding apparatus' shaft. The ends of the first and second rolls are attached.

5 Claims, 5 Drawing Sheets

LOADING APPARATUS FOR AN UNWINDER

FIELD OF THE INVENTION

The invention concerns an unwinder for a web product, and deals in particular with the problem of loading such unwinders. The invention is particularly suited to photographic products but, in general terms, can be used for unwinding any flexible material in web form.

BACKGROUND OF THE INVENTION

FIG. 1, to which reference is now made, illustrates diagrammatically an unwinder 1 as known in the prior art. Such unwinders are used to feed units 13 in which one or more operations are to be performed on the web. By way of example, this may involve a station for printing, perforating, embossing, etc. This list is, of course, not exhaustive.

The unwinder 1 comprises principally a shaft 5, driven in rotation and designed to receive a roll 6 of the web product, wound on a spool 7. Fixed guide means such as rollers 8 are provided so as to make the web 9 describe an unwinding loop. A floating roller or jockey roller device 10 is provided to keep the tension in the web 9 substantially constant. A splicing unit 11 is provided to enable the trailing end of a web that has just been unwound completely (roll N) to be attached to the leader of the web to be unwound and which has just been loaded onto the shaft 5 (roll N+1). The path of the web for a roll at the beginning of its unwinding is depicted in unbroken lines; that of a roll at the end of its unwinding is depicted in broken lines.

The loading of a new roll onto such an unwinder constitutes one of the critical phases of such an unwinding process, which, for reasons of cost, must obviously be carded out in a minimum of time, so as to reduce as far as possible the stoppage time of the machines situated downstream of the unwinder.

A first solution traditionally used consists of waiting for the roll N to unwind completely, removing the empty core 7 from the shaft, disposing the roll N+1 on the shaft 5, passing the leader of the web on the roll N+1 manually around the guide rollers 8 and 10, disposing the leader on the splicing table 11, cutting the free end of the leader and the trailing end of the web on the roll N, bringing the two ends end to end, and joining them by means of an adhesive. All these operations are performed manually and consequently require the machine to be stopped for a fairly long time, which is very onerous in terms of cost.

According to another known approach, guides facilitating the loading and threading of the web are disposed on the unwinding loop of the unwinder 1. This solution helped to make a substantial reduction in the loading time, and therefore in the stoppage time of the machine, but still to an insufficient extent, since none of the steps in the loading of the unwinder can commence before the roll N has been removed from the shaft 5. Furthermore, the modifications that need to be made are not compatible with some existing unwinders.

According to a third approach, an unwinder having multiple shafts is used so that the roll N+1 can be mounted and prepared on a second shaft whilst the roll N is being unwound. At the end of the roll N, the second shaft, with its associated unwinding loop, takes over from the first one. In other words, such a solution comes down to using two unwinders in parallel, the unwinding taking place alternately from one or other of the unwinders. Even though this solution satisfactorily resolves the problem of machine stoppage time, it does, however, give rise to other drawbacks. One of these drawbacks is related to its cost, and another is related to the size of the machine, which is increased considerably owing to the presence of two unwinders in parallel.

SUMMARY OF THE INVENTION

Thus one of the objects of the present invention is to provide an unwinder for a product in web form whose loading does not present the problems referred to above in relation to conventional unwinders.

Another object of the present invention is to provide an unwinder for which the preparation of a roll N+1 is carried out in overlapping time during the unwinding of the roll N.

Other objects of the present invention will emerge in detail in the description that follows.

These objects are achieved according to the present invention by means of an unwinder for a web product, designed to feed an auxiliary unit disposed downstream of the said unwinder, comprising:

a) an unwinding unit having a first rotating shaft designed to receive a roll N of the said web product; an unwinding circuit designed to make the web from the roll N describe a first circulation loop having a given geometry;

b) a unit designed to prepare a roll N+1 during the unwinding of the roll N into the unwinding unit, the preparation unit including: a second shaft designed to receive the roll N+1; and means designed to make the web from the roll N+1 describe a second circulation loop whose geometry is substantially identical to the given geometry and to maintain the web in the given geometry;

c) means for moving the preparation unit in front of the unwinding unit so as to substantially align the first and second shafts, and the first and second circulation loops, respectively; and d) means for, after the complete unwinding of the roll N, transferring the roll N+1 and its associated circulation loop from the preparation unit, respectively, onto the first shaft and onto the unwinding circuit of the unwinding unit.

According to a first characteristic of the present invention, the means for maintaining the web in the given geometry include hollow supports (400) connected to a vacuum source, the hollow supports having their surface in contact with the web, provided with holes opening out inside the support, the hollow supports being disposed so as to define, with guide means (18), a circulation loop for the web (30) having substantially the given geometry, the circulation loop forming substantially circular portions the radius of which is slightly greater than the radius of the corresponding portions of a circle of the first circulation loop.

Advantageously, i) the unwinding unit (1) has a first station (11) for cutting off the trailing end of the web (9) of the roll N, and means (10) for holding the end thus cut off in a given position;

ii) the preparation unit (2) has a second station (19) for cutting off the leading end of the roll N+1, and for applying an adhesive to the leading end, means (19) being provided for holding the leading end of the leader in position, the first (11) and second (19) stations being disposed in such a way that, when the preparation unit (2) is brought opposite the unwinding unit (1), the leading end of the roll N+1 comes to correspond with the trailing end of the roll N, so as to enable an adhesive to be applied in order to join the two ends together.

According to another aspect of the present invention, a method is produced for the loading of an unwinder for a web product designed to feed an auxiliary unit disposed downstream of the unwinder, the said unwinding unit having a first rotating shaft designed to receive a roll N of the said web product and having an unwinding circuit designed to make the web coming from the roll N describe a first circulation loop having a given geometry, the method comprising the following steps:

a) in a preparation unit, during the unwinding of the roll N into the unwinding unit, making the web coming from a roll N+1 describe a second circulation loop whose geometry is substantially identical to the given geometry, the preparation unit having a second shaft designed to receive the roll N+1;

b) maintaining the said web from the roll N+1 in the given geometry;

c) moving the preparation unit in front of the unwinding unit so as to substantially align the first and second shafts, and the first and second circulation loops, respectively; and d) after the complete unwinding of the roll N, transferring the roll N+1 and its associated circulation loop from the preparation unit, respectively to the first shaft and to the unwinding circuit of the unwinding unit.

BRIEF DESCRIPTION OF THE DRAWINGS

In the description that follows, reference will be made to the drawing in which.

DETAILED DESCRIPTION OF THE DRAWINGS

Figure 2:
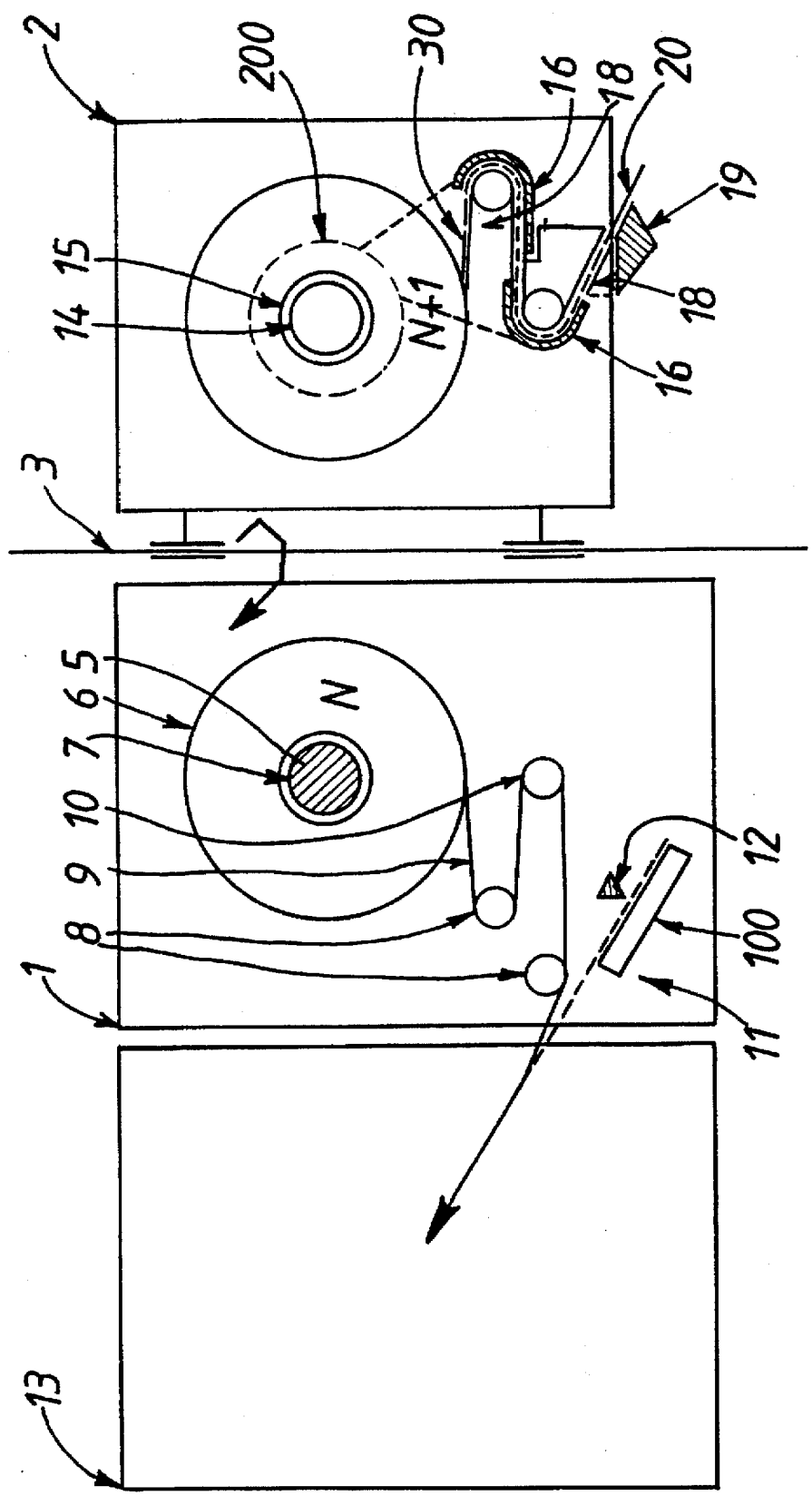
FIG. 2 depicts an overall view of an embodiment of the unwinder according to the invention.

FIG. 2, to which reference is now made, illustrates diagrammatically an overall view of an embodiment of the unwinder according to the invention. As mentioned previously, this is used upstream of a unit 13 in which an operation is, for example, carried out on the film such as a punching, embossing, perforation, printing etc operation.

The unwinder comprises principally an unwinding unit 1, designed to feed the unit 13, and a unit designed to prepare a roll of web product (roll N+1) during the unwinding of a roll N in the unwinding unit 1.

Figure 1:
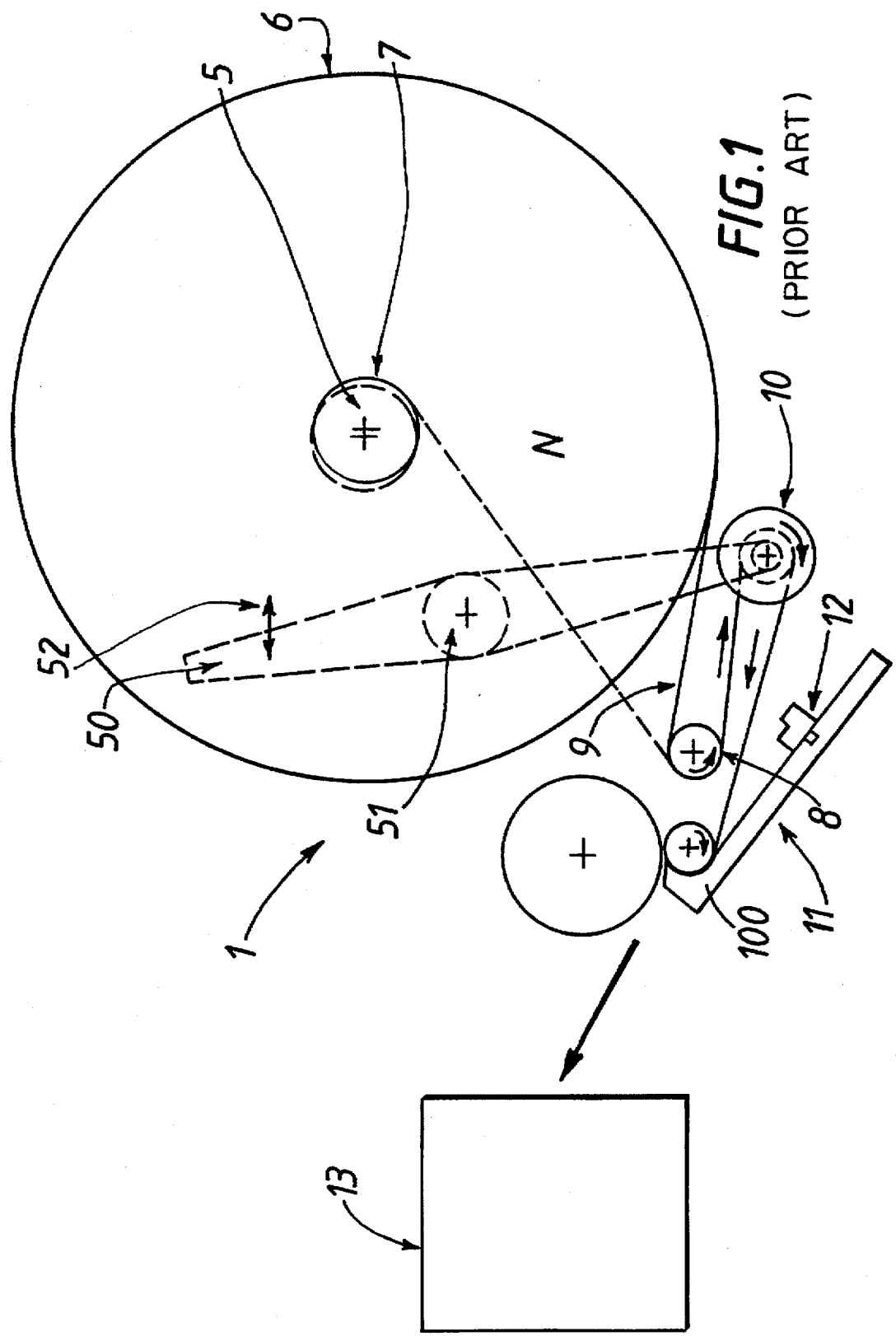
FIG. 1 illustrates diagrammatically a conventional unwinder.

The unwinding unit 1 is substantially in accordance with the one described with reference to FIG. 1, and includes principally an unwinding shaft 5, connected with respect to rotation to the drive for the unit situated downstream 13, and designed to receive a roll 6 (wound, for example, on a spool 7). Advantageously, the shaft 5 is rotated by means of a motor (not shown). The unwinding unit also has fixed guide means in the form of rollers 8, enabling the web 9 to describe an unwinding loop having a given geometry. The tension of the web in the circuit is maintained by means of a floating roller device 10. The latter is identical to the one illustrated in FIG. 1 but, for the sake of the clarity of the drawing, has been depicted in a simplified manner. Typically, such a floating roller is mounted on a member 50 mounted so as to pivot about an axis 51 so as to be able to move in the manner indicated by the bi-directional arrow 52, and springs or other equivalent return means are provided to stress the roller 10 and provide sufficient tension in the web. Such a member has a stop or other equivalent device for limiting its movement, notably when the unwinder is loaded. The latter operation will be the subject of a more detailed description hereinafter.

The unwinding unit according to the invention also has a splicing station 11 in which, by means of an adhesive web, the trailing end of the web from the roll N (the roll whose unwinding is complete) is fixed to the leader of the roll N+1 (the roll to be unwound), preferably after the trailing end of the web from the roll N has been cut off, cutting means 12 being provided for this purpose. Advantageously, the web is held in the cutting/splicing position by applying a negative pressure inside a box 100 supporting the end of the web and on the surface of which holes are formed which communicate with the inside of the box. As will be described in greater detail hereinafter, the adhesive used in order to splice the two ends is placed, in the first instance, on the leader of the roll N+1 in the preparation unit 2.

A circulation loop for the film coming from the roll N is thus produced, having (according to the embodiment illustrated), a geometry the shape of which is substantially identical to an S, or to a plurality of Ss in a cascade.

The preparation unit 2 comprises a shaft 14 designed to receive a roll N+1 in order to be prepared. The web 30 coming from the roll N+1 is brought through means (16, 18, 19) designed to make it describe a circulation loop the geometry of which is substantially identical to that existing in the unwinding unit 1.

Figure 3A:
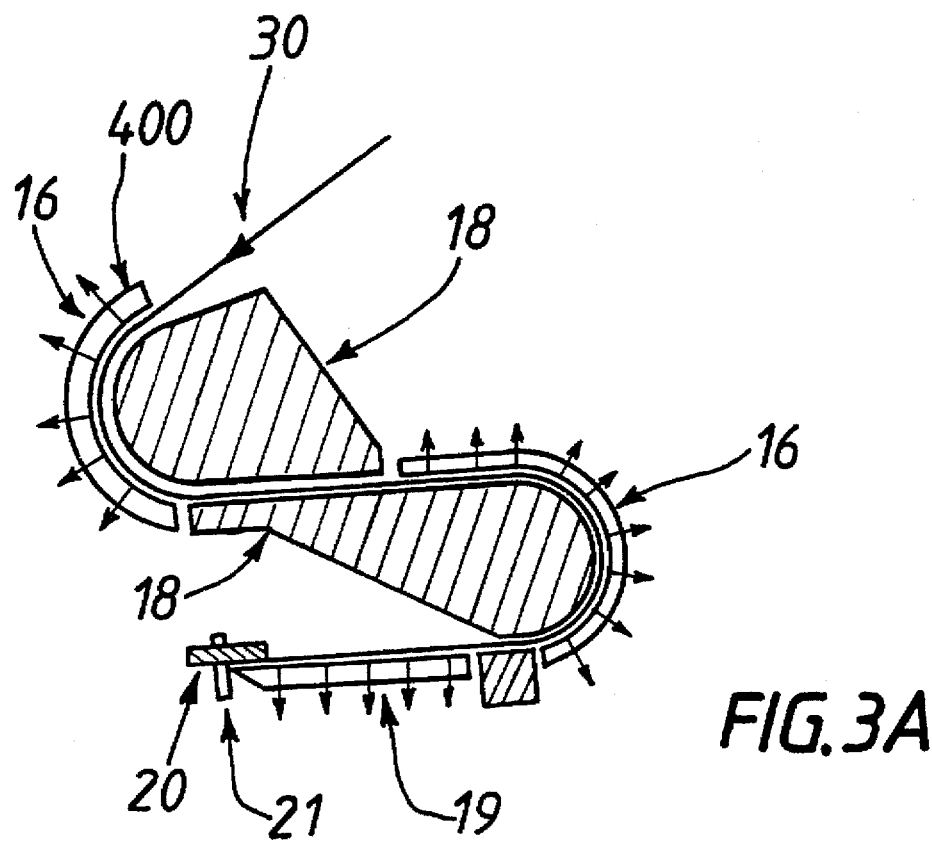
FIGS. 3A–3B depict diagrammatically two preferred embodiments of the means used according to the invention for maintaining the web in the preparation unit in a given geometry.
Figure 3B:
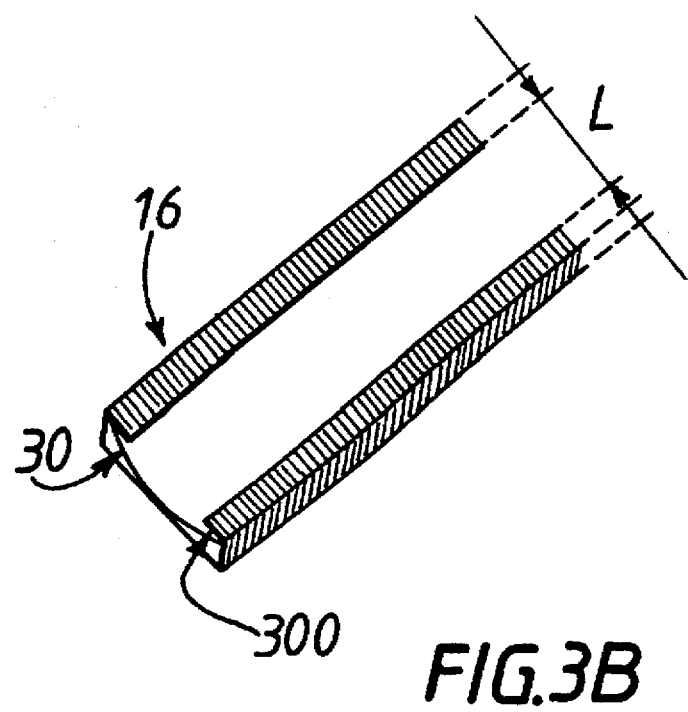

As is more clearly visible in FIGS. 3A and 3B, this loop is produced by means of guide elements 18, independent of the preparation unit. The shape of the guide elements 18 is such that they cooperate with elements for holding the web 30, with which they define a narrow passage of appropriate shape and into which the leader of the web 30 is inserted. Typically, this passage has a height of around a few mm; its width exceeds the width of the film by a few mm. According to the approach depicted in FIG. 3A, the elements for holding the web 16 consist of hollow boxes 400, concave in shape, connected to a vacuum source (not shown) and provided on their surface in contact with the web with holes opening out inside the boxes. Thus, after the web 30 has been inserted into the narrow passage and the free end of the leader has been brought up against a stop 21 in a cutting/splicing station 19, a negative pressure is established inside the boxes 400 so as to press the web 30 against the holding elements 16. Preferably, the negative pressure is established sequentially, starting with the end of the circulation loop furthest from the roll N+1, in order to have a web length that is sufficient for the web to travel satisfactorily over the whole of the circulation loop. The loop thus produced by the web 30 has a geometry which is substantially identical to that of the unwinding unit. The radius of the substantially circular portions defined by the holding elements 16 is slightly greater than the radius of the rollers 8 and 10 of the unwinding unit (typically, a few mm greater) so that the elements 16 surround (partially) the rollers 8, in order to allow the transfer of the roll N+1 (with its associated circulation loop) from the preparation unit to the unwinding unit. In other words, the diameter of the substantially circular portions forming the path of the web 30 in the preparation unit is slightly greater than the corresponding substantially circular portions of the path of the web in the unwinding unit. The transfer from the preparation unit to the unwinding unit will be the subject of a more detailed description hereinafter.

According to one advantageous embodiment, these guide elements are fixed to the frame of the preparation unit so that the guide elements remain fixed during transfer from the preparation unit to the unwinding unit. According to an alternative, removable elements which are removed from the preparation unit before transfer are used.

As a further alternative, no guide elements 18 are used, the web being positioned directly upon the vacuum boxes, starting with the end of the circulation loop opposite the roll N+1, and rising progressively to the other end, the negative pressure having been established in the boxes prior to the positioning of the web. According to another alternative, the web is held on the circulation loop by means of an adhesive composition covering the inner surface of the guides 16, this last solution enabling the use of suction boxes to be dispensed with. According to yet another alternative, and as is shown in FIG. 3B, the web 30 is held by means of lugs 300 disposed regularly over substantially the whole length of the circulation loop on both sides of the width of the web so as to define rails guiding and holding the web, these lugs 300 having portions of edges parallel to the plane of the web, the portions of edges defining a space, the width L of which is slightly less than the width of the web. The positioning of the web behind the lugs is permitted by the elasticity of the web 30 or lugs 300. The web is extracted in the same way, by counteracting the forces resulting from the elasticity of the web and/or of the lugs.

Preferably, the cutting/splicing station 19 also consists of a hollow support connected to a vacuum source so as to hold the web in an appropriate position under the effect of the negative pressure in order to cut off the end thereof and place an adhesive thereon. Such a holding in position (for example, in reference against a stop 21) makes it possible to position the leader of the roll N+1 perfectly with respect to the trailing end of the roll N during transfer to the unwinding unit, and thus to facilitate the attaching thereof.

As can be seen in FIG. 2, the preparation unit 2 is mounted with respect to the unwinding unit in such a way as to be able to be moved so as to face the unwinding unit 1 in order to be able to substantially align their respective shafts 5, 14, and their respective circulation loops. With the exception of the guide elements 18 (fixed to the frame), all the elements of the preparation unit are moved in facing relationship with the unwinding unit. Advantageously, the preparation unit is hinged with respect to the unwinding unit so as to pivot about a substantially vertical axis 3. Other arrangements can be envisaged for the mounting of the preparation unit on the unwinding unit.

Figure 4:
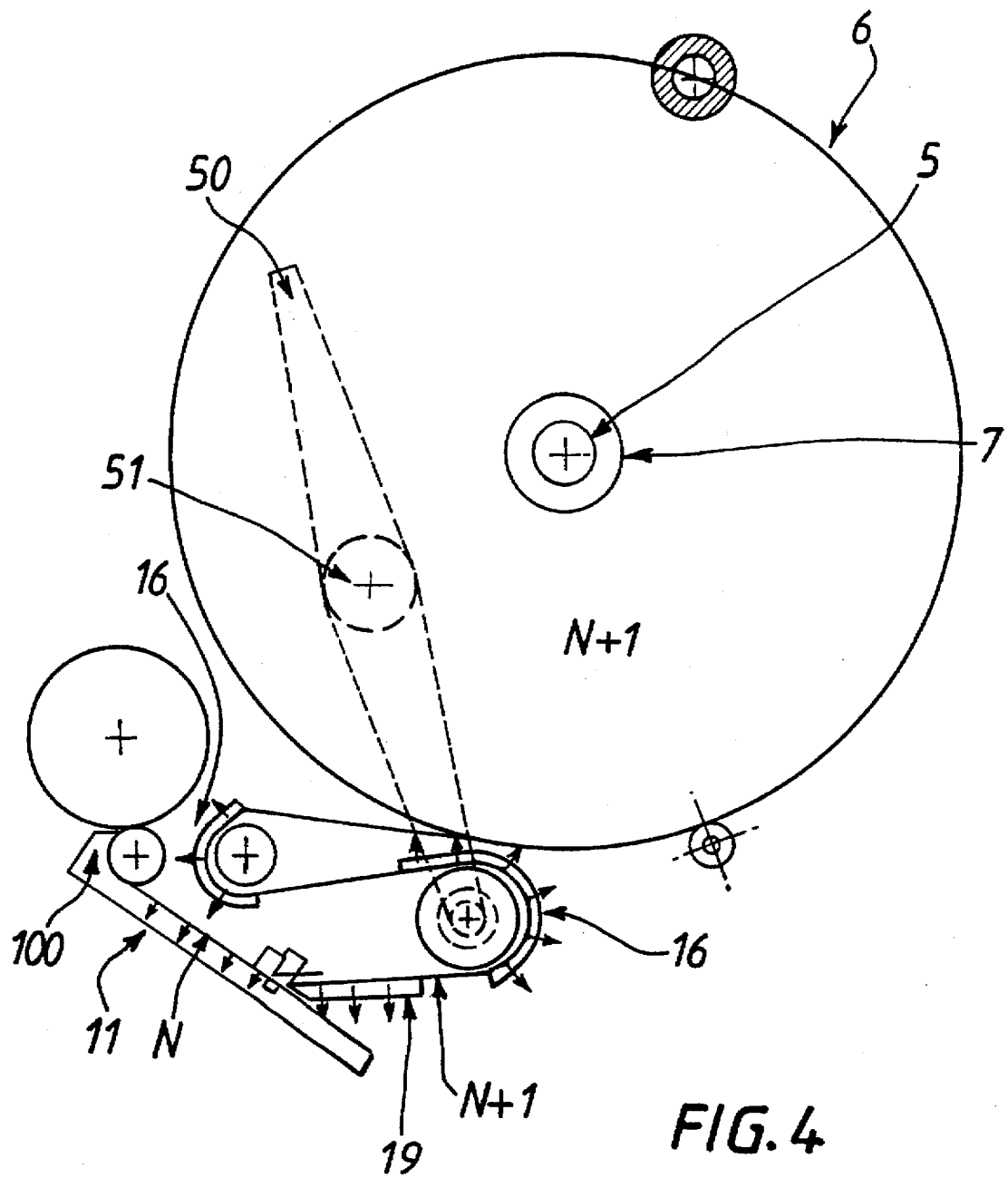
FIG. 4 illustrates diagrammatically a first step in the loading of the unwinder depicted in FIG. 2.
Figure 5:
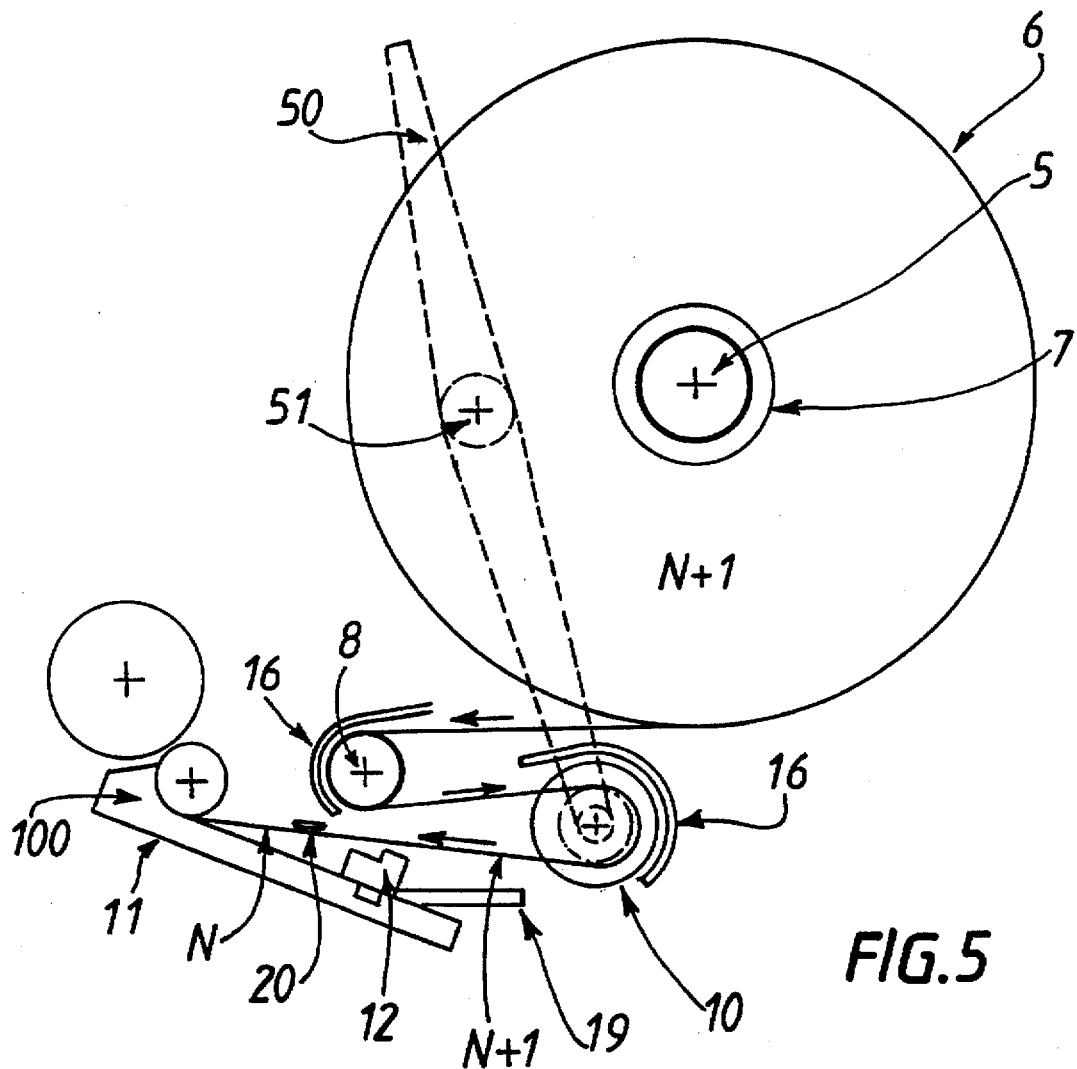
FIG. 5 depicts a second step in the loading of the unwinder depicted in FIG. 2.

Hereinafter, reference will be made more particularly to FIGS. 3, 4 and 5 of the drawing, which illustrate diagrammatically the steps in the loading of the unwinder according to the invention.

Thus, during the unwinding of the roll N in the unit 1, an operator positions the roll N+1 in the preparation unit; the free end of the leader is inserted inside the narrow passage formed by the guide elements 18 and by the holding elements 16, in order to be brought finally into position on the cutting/splicing table 19; a negative pressure is applied inside the elements 16 and 19 (typically, the negative pressure is around 0.3 bar) so as to mobilize the web according to the geometry defined by the holding elements 16 and 19; an adhesive 20 is then placed on the free end of the leader; it may be desirable first to cut off the end of the leader prior to placing the adhesive thereon; the roll N+1 is then ready to be transferred to the unwinding unit.

At the end of the unwinding of the roll N, the trailing end of the web N is immobilized on the cutting/splicing table 11 in order to be cut off thereon; the empty spool of the roll N is removed from the shaft 5; the preparation unit is pivoted so as to face the unwinding unit; at this moment, the roll N+1, and the elements 400, 19, are transferred onto the shaft 5; the web held against the elements 16 is positioned around the rollers 8 and 10 (FIG. 4; the arrows show diagrammatically the forces exerted on the web due to the negative pressure in the boxes 16 and on the cutting/splicing stations 11 and 19 so as to press the web against the various vacuum elements); the end of the leader of the roll N+1 (bearing an adhesive), immobilized on the table 19, is brought into correspondence with the trailing end of the roll N positioned on the table 11; at this moment, the two ends can be joined; the transfer of the web from the holding elements 16 to the rollers 8 and 10 is obtained by turning the roll N+1 slightly backwards on the shaft 5 (FIG. 5; the web 9 now rests upon the rollers 8 and 10 and is no longer bonded to the holding elements 16); the film is, in fact, freed on the one hand by peeling and on the other hand due to the drop in the vacuum level in the vacuum part, caused by the increase in the leakage area; this effect can be reinforced by producing several boxes, connected in series by calibrated orifices; the cascading drop in vacuum will, moreover, reduce the forces needed in order to unstick the web, thereby avoiding abrasion; the unwinder 1 is then ready for a new unwinding cycle.

As regards the means enabling the preparation unit to be transferred to the unwinding unit, these preferably allow a simultaneous transfer of the roll N+1 and its circulation loop. According to an advantageous embodiment, an axial stop 200 (a ring, for example) is used, mounted so as to slide on the shaft of the preparation unit, and against which the roll N+1 abuts, the axial stop 200 being fixed to the holding elements 16. During transfer, an operator pushes back the axial stop, the effect of which is to push back simultaneously the roll N+1 and its associated circulation loop, as defined by the elements 16. This permits a satisfactory synchronization between the advance of the reel and its circulation loop during transfer. Other arrangements are possible for transferring the roll N+1 and its associated circulation loop 16 simultaneously.

The unwinder according to the invention is particularly advantageous in that it substantially limits the stoppage time for machines between two rolls; it enables the free ends of two consecutive rolls to be joined together more easily and more efficaciously, by considerably facilitating the bringing into correspondence of the two ends to be attached. The preparation unit is independent of the unwinding unit, which does not entail any substantial modifications to conventional unwinders. It is not necessary to wait until the preparation unit has been retracted before starting up the unwinder, the preparation unit being designed in such a way as not to disrupt the operation of the unwinding unit.

The unwinder according to the invention has been described with reference to preferred embodiments. It is evident that variants can be made thereto without departing from the spirit of the invention as claimed hereinafter.

What is claimed is:

1. A loading apparatus for loading a first roll of web material for unwinding, comprising:

an unwinding apparatus having a first rotating shaft adapted to receive the first roll, said unwinding apparatus having a first circulation loop and tensioning means for providing a predetermined tension in the web material;

a preparation apparatus including a second rotating shaft supporting the first roll, a second circulation loop having a geometry substantially similar to said first circulation loop, and means for maintaining the web along said second circulation loop;

moving means for moving said preparation apparatus in registration with said unwinding apparatus to substantially align said first shaft with said second shaft and said first circulation loop with said second circulation loop;

a joining station for joining a leading end of the first roll of web material with a trailing end of a second roll of web material, said joining station being disposed downstream of said first circulation loop and said tensioning means; and transfer means for transferring the first roll of web material from said second shaft and said second circulation loop to said first shaft and said first circulation loop, respectively.

2. The loading apparatus according to claim 1 wherein said second rotating shaft rotates about a first axis, and said moving means moves said preparation apparatus about a second axis perpendicular to said first axis.

3. The loading apparatus according to claim 1 wherein said second circulation loop comprises supports having a concave surface and said means for maintaining include a hollow plenum associated with a vacuum source and provided with openings to said concave surface.

4. The loading apparatus according to claim 3 wherein said unwinding apparatus includes a least one roller having a first radius, and said concave surface includes substantially circular portions having a second radius greater than said first radius.

5. A method for loading an unwinding apparatus with a roll of web material, said unwinding apparatus having a first rotatable shaft adapted to receive the roll, a first circulation loop, and tensioning means providing a predetermined tension in the web material, said method comprising the steps of:

loading the roll on a second rotatable shaft of a preparation apparatus, said second shaft being rotatable about a first axis;

forming the web material of the roll through a second circulation loop of said preparation apparatus, the second circulation loop having a geometry substantially similar to said first circulation loop;

applying vacuum to maintain the web material of the roll in said second circulation loop;

moving said preparation apparatus about a second axis perpendicular to said first axis to align said first shaft with said second shaft and said first circulation loop with said second circulation loop;

transferring the roll from said second shaft and said second circulation loop to said first shaft and said first circulation loop, respectively.

* * * * *